March 6, 1962
H. V. HINRICHSEN ETAL
3,024,349
ROLLER RE-SURFACING MACHINE
Filed Jan. 27, 1960
2 Sheets-Sheet 1
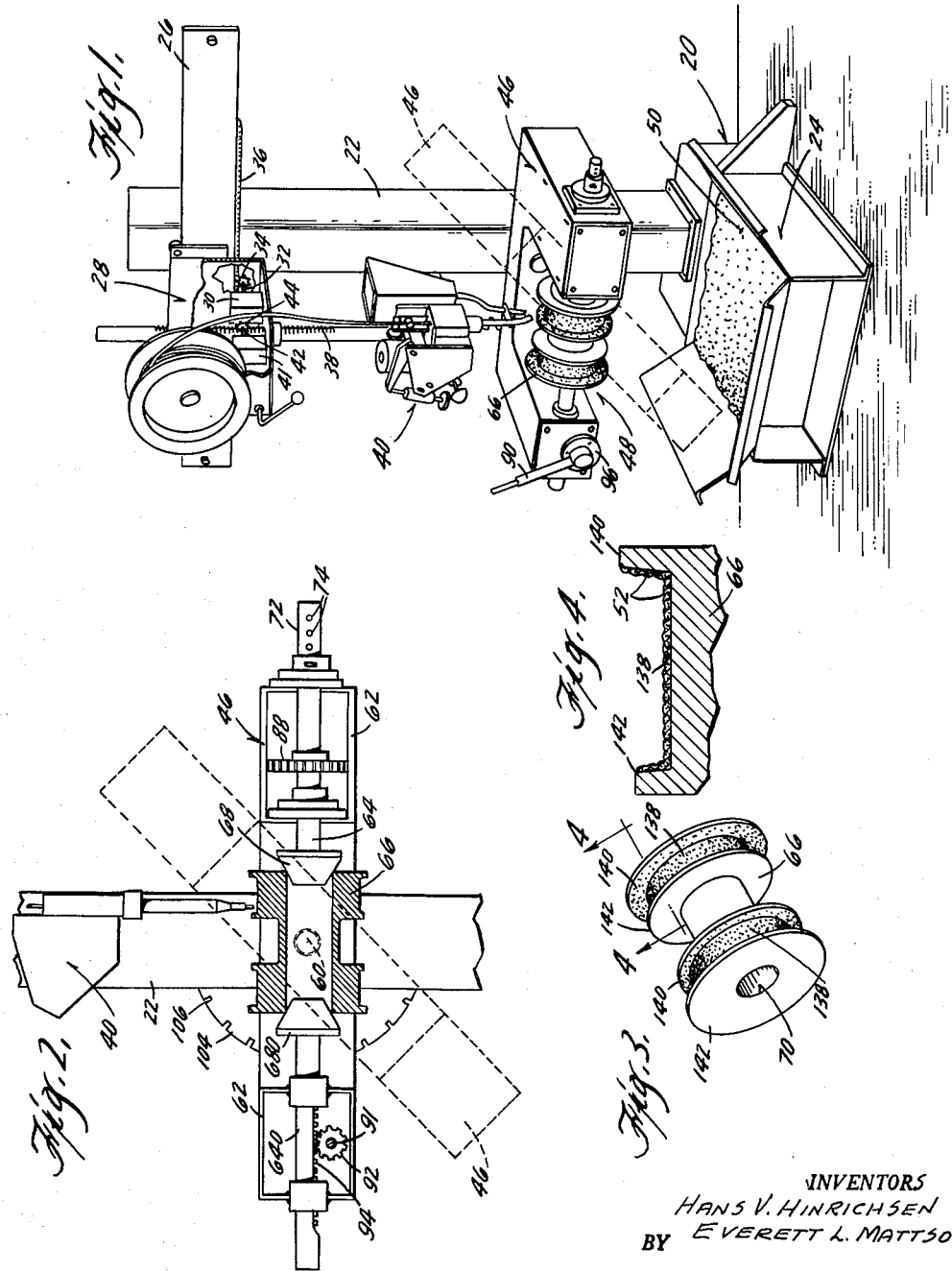
INVENTORS
HANS V. HINRICHSEN
EVERETT L. MATTSON
BY
Wheeler, Wheeler and Wheeler
ATTORNEYS.

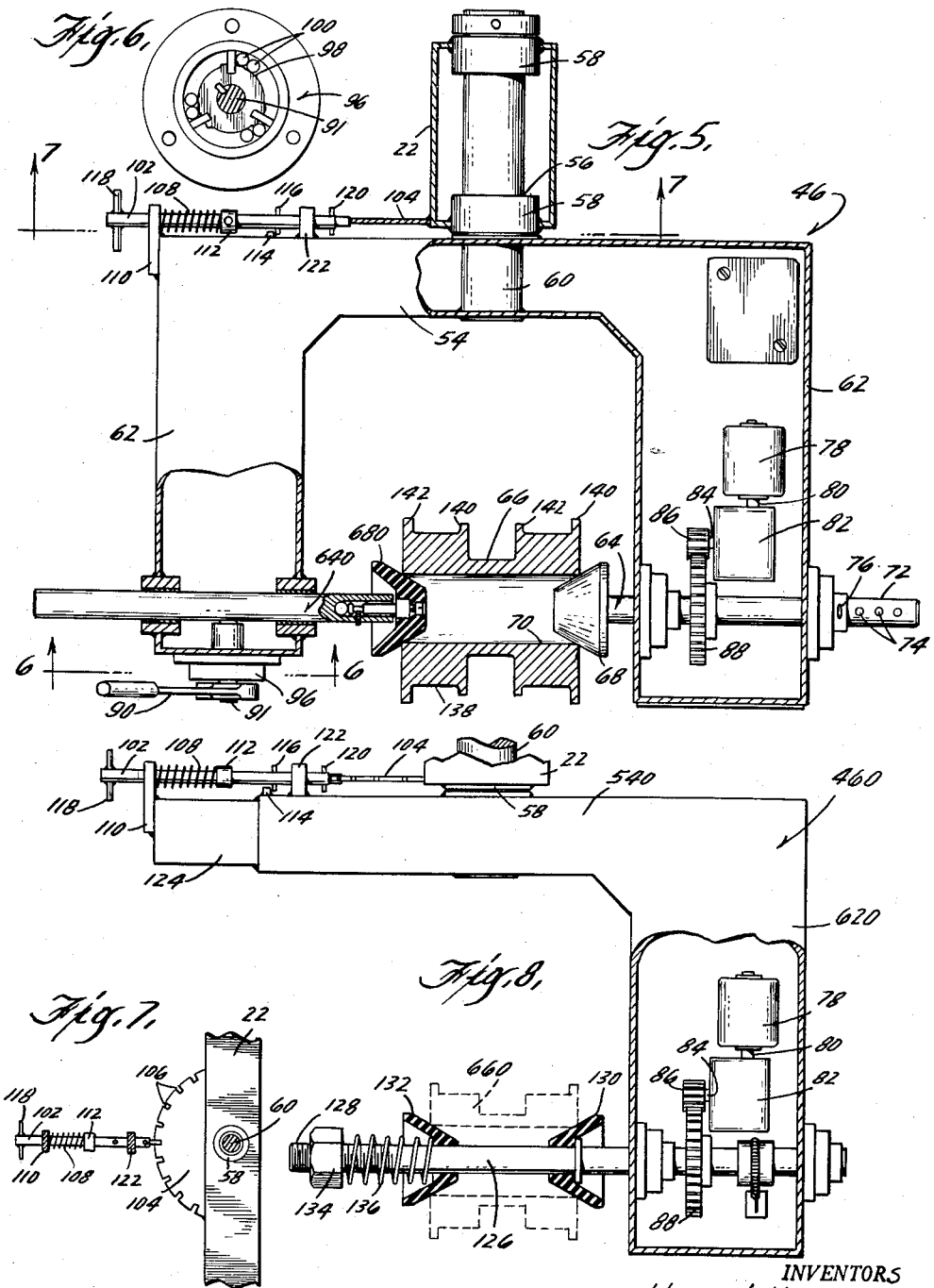

United States Patent Office 3,024,349
Patented Mar. 6, 1962

3,024,349
ROLLER RE-SURFACING MACHINE
Hans Vero Hinrichsen, West Allis, and Everett L. Mattson, Brookfield, Wis., assignors to Automatic Welding Company, Waukesha, Wis., a corporation of Wisconsin
Filed Jan. 27, 1960, Ser. No. 4,984
15 Claims. (Cl. 219—73)

The present invention relates to automatic welding machines and more particularly to a machine for re-surfacing the rollers and idlers of a track vehicle by depositing beads of weld metal thereon.

As the tracks of the track vehicle are driven, the links which support the cleats of the track travel over a set of rollers and an idler sprocket in addition to the drive gear of the vehicle. These links are worn considerably during the course of their travel over the idler and the rollers and in my co-pending application Serial No. 836,370 I have described a machine which is expressly designed for the purpose of rebuilding the links which support the tracks. Of course, as these links travel over the rollers and the idler, the rollers and idler are also worn to a considerable extent. To prevent the rollers and idler from being worthless scrap steel after they are worn, it has become customary to rebuild the rollers and idler as well as the tracks so that this equipment may be reused.

In the past a machine such as the "Multi-Matic" produced by Automatic Welding Company, a Wisconsin corporation of Waukesha, Wisconsin, has been used for re-surfacing the rollers and idlers of a track vehicle. Briefly, a machine of this type included a generally circular table upon which was mounted a plurality of axles for holding rollers. These axles are spaced equidistant around the outer portion of the table surface and extend at right angles from the surface. Each of these axles is arranged to be rotated and thereby to rotate the roller mounted thereon so that weld metal can be deposited around the circumference of the roller surfaces as desired. The rollers must, of course, be driven because the welding head is stationary. The entire table was rotatable such that after one strip of weld was deposited on each roller, each of the other rollers had the same strip deposited before the first roller came back under the welding head for the deposit of the next bead of weld metal. The table rotation is required in order that the roller may dissipate some of the heat which built up from the first bead of weld being deposited. The entire table is indexable such that the flanges of the rollers can be positioned to be relatively level so that weld metal can be deposited on the flanges and rebuild the flange surfaces.

A machine such as the type described for re-surfacing rollers and idlers is an extremely expensive and bulky piece of equipment.

The present invention concerns a yoke mounted chuck arrangement in which one roller at a time may be gripped, locked, welded on the surfaces normally flat with respect to the welding heads, and the entire yoke pivoted through an arc to orient the flanges relatively level with respect to the welding heads and the yoke may then be locked in the position desired. Therefore, the chuck will position and manipulate the rollers such that the flanges as well as the other worn areas of the rollers may be rebuilt.

One of the chuck members is rotatable at a desirable speed such that the welding heads may be fixed in position and the roller rotated at the required speed so that weld metal is deposited in the desired bead.

The welding head is mounted and arranged with respect to the machine frame so that it may travel laterally and vertically with respect to the piece to be welded so that an entire roller and both flanges may be welded on one machine which can adjust to accommodate the positions of the pivoted yoke. In addition, at least one variation on the machine is possible in which only a half-yoke is provided on which the roller may be chucked and the same operations performed. The chucking and dechucking operations are slightly more difficult in the latter machine.

In the drawings:
FIG. 1 is a perspective view of a roller re-surfacing machine embodying the present invention.
FIG. 2 is a front elevational view of a portion of the machine in FIG. 1 showing elements of the yoke and the mounting arrangement in section.
FIG. 3 is a perspective view of a roller which can be re-surfaced upon the machine of FIGS. 1 and 2.
FIG. 4 is an enlarged view taken along line 4—4 of FIG. 3.
FIG. 5 is a top plan view of the machine yoke having portions broken away to show the chucking mechanism in detail.
FIG. 6 is a view taken along line 6—6 of FIG. 5.
FIG. 7 is a view taken along line 7—7 of FIG. 5.
FIG. 8 is a top plan view of a half-yoke embodiment having portions broken away to show the chucking arrangement.

The machine of the present invention consists of a base 20 and an upright post 22 extending from the base. The post 22 is attached to the back part of base 20, the front part of which comprises a flux catching tub 24. Adjacent the top of post 22, a cross-member 26 is mounted which extends at right angles to post 22. A carriage 28 having a drive motor 30 is fixed to cross-member 26, and the shaft 32 of motor 30 has a pinion 34 which engages a rack 36 on cross-member 26 for positioning the carriage laterally along the cross-member 26. Extending vertically through carriage 28 and parallel to post 22 is a vertical rack 38. The welding head 40 is fixed to the lower extremity of rack 38. The carriage 28 has a second motor 41 for driving rack 38 through shaft 42 and pinion 44 to raise and lower welding head 40. The pinion 44 engages the vertical rack 38 and raises and lowers it and welding head 40. It should be noted that more than one carriage 28 and head 40 may be mounted on a cross-member 26 if desired.

Extending outwardly from the upright member 22 intermediate the carriage 28 and the base 20, is a U-shaped yoke 46 including a track roller chuck arrangement 48.

The yoke 46 is positioned relative to the upright member 22 and between the carriage 28 and the tub 24, such that flux 50 which is deposited over the weld beads 52 during the course of the submerged arc welding process will drop in the tub 24 which is provided for flux recovery.

The yoke can be made in several ways and only one method is indicated in FIGS. 1, 2 and 5. In the arrangement shown in these figures an elongated yoke mounting member 54 is provided which is pivotally connected intermediate its ends to the upright post 22.

A pivot receiving opening 56 is provided in the upright post 22 having sleeve bearings 58 therein, into which pivot shaft 60 may be inserted.

Extending from each end of the elongated member 54 in the preferred arrangement are a pair of arms 62.

Extending from arms 62 toward each other are a pair of coaxial shaft chucks 64 and 640. Chuck 64 referred to is capable of being fixed in any one of a plurality of desired positions and the other chuck 640 is retractable. The roller 66 is slipped over cone 68 on chuck 64 and cone 680 on the retractable chuck is extended until it is inserted in the axle hole 70 of roller 66 and tightly grips roller 66. If the chucking operation thus performed does not tightly grip the roller 66 or if the relative position of the cone 68 and 680 is such that roller 66 cannot be gripped between the cones, then coaxial chuck 64 is moved to one of the plurality of positions it can be fixed in until the gripping operation can be properly performed.

Positioning chuck 64 is accomplished by providing chuck 64 with a concentric shaft 72. Each of these shafts is provided with a plurality of apertures 74 and the two shafts may be variously positioned with registering apertures 74 and a cotter key 76 dropped through the registering openings 74 when the desired relative position of the shafts is achieved. It is this quill shaft arrangement which enables the roller to be rotated.

Within the arm 62, which supports chuck 64, there is also supported an electric motor 78 having output shaft 80 which interconnects motor 78 and the gear reduction box 82. Gear box 82 has an output shaft 84 upon which a pinion gear 86 is supported. Pinion gear 86 is positioned to be in mesh with a driven gear 88 on shaft 72, thereby to rotatably drive cone 68 through the quill shaft arrangement.

Chuck 640, which is supported in the other arm 62 of U-shaped yoke 46, includes a manually operated handle 90 pivoted through the end of arm 62 and having a pinion 92 which engages with a rack 94 on chuck 640 to operate the chuck 640 to be advanced and retracted. Cone 680 is rotatably mounted on rack 640 which is fixed against rotational movement. A pivot shaft 91 extends between handle 90 and pinion 92 and there is keyed on the shaft 91 a "Swartz Lock" 96 which is shown in detail in FIG. 6 as having a cam 98 and a plurality of rollers 100. The operation of this lock is such that the rollers 100 engage with the cam 98 by rotation in one direction, preventing accidental retraction of the chuck 640 by preventing the lock from releasing except by forceable manual rotation of the handle 90 in the opposite direction.

It is an interesting feature of the yoke 46 as I have described it that it is symmetrical and balanced by the chuck construction such that it is relatively easy for the the operator of the machine to index it through its possible positions. An index locking bar 102 is rotatably and axially slidably mounted on extended yoke member 54 which cooperates with an index plate 104 so that the yoke 46 may be indexed through an arc, illustrated in this drawing as approximately 120 degrees, but which could be extended. When the desired position of yoke 46 is achieved, the locking bar 102 is slipped into engagement with grooves 106, in the index plate 104 to hold the yoke 46 in predetermined position. The locking bar 102 is continuously biased by a spring 108 surrounding the bar 102 and confined between mounting bracket 110 and collar 112 toward engagement with plate 104. A stop or detent 114 is mounted on member 54 and a pin 116 is provided transversely of bar 102 which can be engaged with stop 114 by rotation of the bar through twisting handle 118. This pin 116 requires that handle 118 be manipulated to engage and disengage the bar 102 and plate 104 preventing accidental locking or unlocking. Spring 108 also insures manual withdrawal of bar 102 from plate 104 against the bias of the spring. Accidental unlocking is therefore further diminished. A second locking pin 120 is provided transversely of bar 102 for engagement with mounting bracket 122 to prevent bar 102 from accidentally being removed from the brackets when pulling against spring 108.

An alternate form of yoke 460 can be used in which the yoke 460 comprises approximately one half of yoke 46 and is generally L-shaped. The pivot arrangement with respect to the upright member is the same except the elongated yoke mounting member 540 has just one arm 620 at one end and is provided at the other end with counter-balance weight 124. A shaft chuck 126 is provided which extends from arm 620 and which is driven in a manner similar to that described with respect to the full yoke 46. However, in this arrangement the quill shaft is not necessary because chuck 126 need not be adjustable. The end of the chuck shaft 126 is threaded at 128 and a fixed driving cone 130 is fixed intermediate the threads 128 and arm 620. A roller 660 may be slipped over shaft 126 and slip cone 132 slipped over shaft 126 and locked in place with locking nut 134 and spring 136. As long as shaft 126 is long enough to accommodate all of the known sizes of rollers, the locking nut 134 and spring 136 will make all the necessary adjustments to hold all of the various sizes of rollers 660 in fixed position during the welding operation.

Referring now to FIGS. 3 and 4 the roller 66 may be placed in the yoke 46 or 460 and welded first across its flat surfaces 138 and subsequently across its flanges 140 and 142. Two flat surfaces 138 and two flanges either 140 or 142 may be welded at one time by mounting a second welding head as previously suggested. This will cut in half the amount of time devoted to re-surfacing a roller.

The tiltable yoke 46 or 460 and the chucking arrangement shown in this application provides a method for gripping, handling, and rotating rollers which has all of the advantages associated with the prior art machine and in addition is considerably less bulky and less expensive.

We claim:

1. The combination with an automatic submerged arc welding machine for re-surface welding of a roller for the track of a tractor and having a base and an upright member, a cross-member adjacent the upper end of the upright member and a welding means mounted on the cross-member and vertically and horizontally adjustable, of a tiltable counterbalanced yoke pivoted to the upright member and having means for rotatably supporting the roller.

2. The device of claim 1 in further combination with positive drive means for driving the roller supporting means.

3. The device of claim 1 in further combination with positive drive means supported by the yoke for driving the roller supporting means.

4. The device of claim 1 in further combination with positive drive means enclosed within the yoke for driving the roller supporting means whereby the roller driving means are protected against action of the arc.

5. The combination with an automatic submerged arc welding machine for re-surface welding of a roller for the track of a tractor and having a based and an upright member, a cross-member adjacent the upper end of the upright member and a welding means mounted on the cross-member and vertically and horizontally adjustable, of a tiltable counterbalanced yoke pivoted to the upright member and having means for rotatably supporting the roller and positive drive means supported by the yoke for driving the roller supporting means, said positive drive means providing at least a portion of the weight for balancing the yoke in a predetermined position.

6. The combination with an automatic submerged arc welding machine for re-surface welding of a roller for the track of a tractor and having a base and an upright member, a cross-member adjacent the upper end of the upright member and a welding means mounted on the cross-member and vertically and horizontally adjustable, of a tiltable counterbalanced yoke pivoted to the upright member and having means for rotatably supporting the roller, and an index plate fixed to the upright member and an index lock mounted on and moveable with the yoke for engaging the index plate.

7. The combination with an automatic submerged arc welding machine for re-surface welding of a roller for the track of a tractor and having a base and an upright member, a cross-member adjacent the upper end of the upright member and a welding means mounted on the cross-member and vertically and horizontally adjustable, of a manually tiltable counterbalanced yoke pivoted to the upright member and having means for rotatably supporting the roller, an index plate fixed to the upright member, and a locking bar rotatably and axially slidably mounted on the yoke and having a spring for biasing the bar in one sliding direction for engagement with the plate and having a pin extending transversely of the bar for engagement with the mounting whereby the locking bar is locked against disengagement with the mounting.

8. The combination with an automatic submerged arc welding machine for re-surface welding of a roller for the track of a tractor and having a base and an upright member, a cross-member adjacent the upper end of the upright member and a welding means mounted on the cross-member and vertically and horizontally adjustable, of a manually tiltable counterbalanced yoke pivoted to the upright member and having means for rotatably supporting the roller, an index plate, a locking bar, and a stop mounted on the tiltable yoke, the locking bar having a pin extending transversely of the bar for engagement with the stop whereby the locking bar must be rotated for axial retraction from the index plate.

9. The combination with an automatic submerged arc welding machine for re-surface welding of a roller for the track of a tractor and having a base and an upright member, a cross-member adjacent the upper end of the upright member and a welding means mounted on the cross-member and vertically and horizontally adjustable, of a manually tiltable counterbalanced yoke pivoted to the upright member and having means for rotatably supporting a roller, the yoke being generally U-shaped and providing yoke arms and pivoted to the upright member for tilting in an arc, and chucks severally mounted on the yoke arms, the chucks being axially adjustable and one of the chucks being power driven and the other of the chucks being an idler, and means for locking the chucks in adjustable position.

10. The device of claim 9 in which the power driven chuck has a plurality of transverse apertures for receiving a pin for holding the chuck in predetermined position.

11. The device of claim 9 in which the power driven chuck has a first shaft and a quill shaft about the first shaft and means for adjustably joining the first shaft and the quill shaft.

12. The device of claim 9 in which the idler chuck includes an axially slidable axle and an idler cone rotatably mounted on the axle and means for locking the idler cone in predetermined position.

13. The combination with an automatic submerged arc welding machine for re-surface welding of a roller for the track of a tractor and having a base and an upright member, a cross-member adjacent the upper end of the upright member and a welding means mounted on the cross-member and vertically and horizontally adjustable, of a tiltable counterbalanced yoke pivoted to the upright member and having an extended yoke member, the yoke being generally L-shaped and tiltable in an arc, an arm of the yoke extending from one end of the extended yoke member supporting a shaft and a power drive therefor, and a counterweight mounted on the other end of the extended yoke member.

14. The device of claim 13 in which the shaft supports a fixed chuck member and a spring biased chuck member moveable axially of the shaft.

15. The device of claim 14 in further combination with means for adjusting and locking the spring biased chuck member in desired position.

References Cited in the file of this patent
UNITED STATES PATENTS
2,938,997   Anderson _____ May 31, 1960